United States Patent [19]
Holdeman et al.

[11] 4,386,493
[45] * Jun. 7, 1983

[54] METHOD AND APPARATUS FOR MAKING LARGE ROUND CROP BALES

[75] Inventors: Adin F. Holdeman; Melvin V. Gaeddert; Howard J. Ratzlaff; Martin E. Pruitt; Howard R. Lohrentz, all of Hesston, Kans.

[73] Assignee: Hesston Corporation, Hesston, Kans.

[*] Notice: The portion of the term of this patent subsequent to Mar. 30, 1982, has been disclaimed.

[21] Appl. No.: 362,473

[22] Filed: Mar. 26, 1982

Related U.S. Application Data

[63] Continuation of Ser. No. 584,870, Jun. 9, 1975, Pat. No. 4,321,787.

[51] Int. Cl.³ ............................................. A01D 39/00
[52] U.S. Cl. .................................. 56/341; 56/DIG. 2
[58] Field of Search ............. 56/341, DIG. 2; 100/88, 100/5

[56] References Cited

U.S. PATENT DOCUMENTS

3,964,246 6/1976 Kopaska ................................ 100/88

FOREIGN PATENT DOCUMENTS

178595 1/1966 U.S.S.R. ................................ 56/341

*Primary Examiner*—Jay N. Eskovitz
*Attorney, Agent, or Firm*—Schmidt, Johnson, Hovey & Williams

[57] ABSTRACT

The bale-forming machine has rolling mechanism that initially tumbles loose crop material forwardly between the mechanism and the ground as the machine advances along a windrow. Thereafter, the rolling material becomes confined off the ground in an elevated forming chamber as additional material is fed into the chamber and as the mechanism rolls the material into a bale. Upon reaching a predetermined size, the bale can be tied and then ejected from the chamber through the raised rear section of the machine.

2 Claims, 8 Drawing Figures

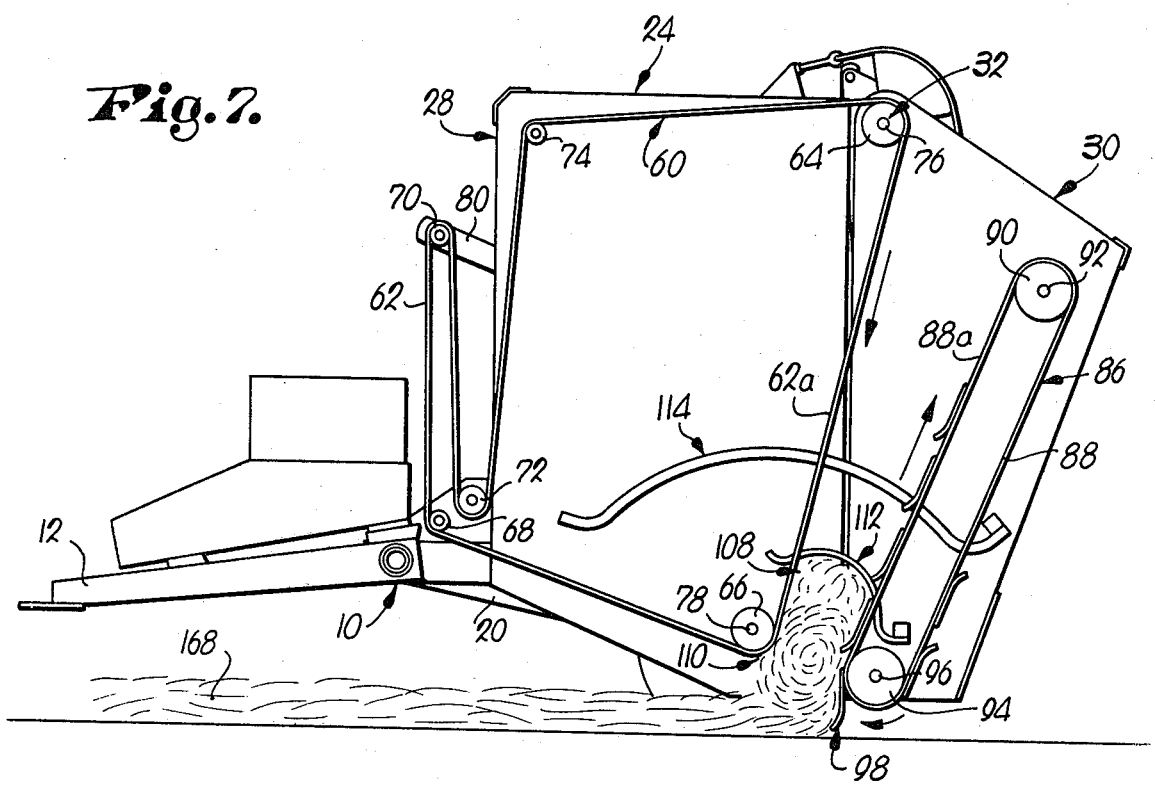
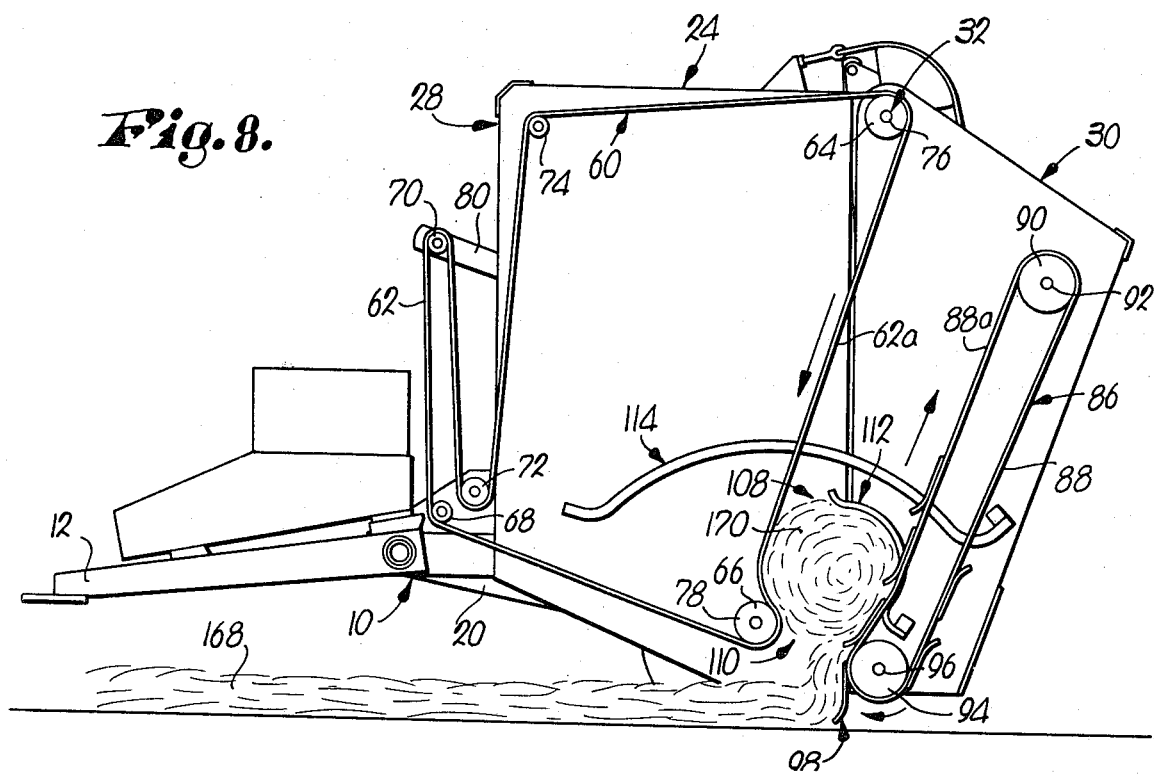

METHOD AND APPARATUS FOR MAKING LARGE ROUND CROP BALES

This is a continuation of application of Ser. No. 584,870 filed on June 9, 1975, now U.S. Pat. No. 4,321,787.

This invention relates to the formation of large bales of hay or other crop mateials on the order of 1,000 pounds or more, such bales assuming a cylindrical configuration upon formation and being conventionally characterized as "round" bales in the art.

Machines for forming large round crop bales have heretofore been divided into two major classes, i.e., those that roll the bale along the ground in snowball fashion such as shown in Avery, U.S. Pat. No. 3,110,145, and those which form the bale off the ground in an elevated forming chamber such as shown in Vermeer, U.S. Pat. No. 3,722,197. The snowball or ground-roll type of machine has a number of advantages such as generally excellent bale starting (where the bale is confined between upper rolling mechanism on the one hand and the ground or the other hand), simplicity, low-cost, and few maintenance and repair problems, but it also has certain shortcomings such as having a tendency to pick up sticks, stones and other trash material to be rolled in with the bale, the inconvenience of requiring the operator to pull the machine out of the window during tying of the bale so that the bale is rolling on a "clean" area as the twine is wound around the rolling bale, and the fact that the finished bale cannot be easily moved to a remote location since it remains in contact with the ground after being completely formed.

On the other hand, off-the-ground roll machines also have advantages and disadvantages when compared with their ground roll counterparts, some advantages being, for example, production of relatively trash-free bales, tying of the finished bale by simply rolling the bale in the chamber while the machine remains motionless in the window, and the ability to quite readily transport the completed bales to any selected location perhaps quite distant from the baling site. Disadvantages include difficulties in initiating bale rolling in certain instances because the frictional contact provided by the ground or crop stubble is not available when the bale is initiated in the elevated chamber, plus relatively greater expense both in manufacture and maintenance when compared with the ground-roll machines.

Accordingly, an important object of the present invention is to provide a new method and apparatus for large round bale formation that blends together the advantages of ground roll and off-the-ground roll machines while avoiding their disadvantages.

More particularly, an important object of this invention is the provision of a baler for large round bales wherein bale formation is initiated between crop-rolling mechanism and the ground but is then completed off the ground in an elevated chamber.

An additional important object of this invention is to provide improved crop-lifting and feeding mechanism that serves not only to initially pick up crop material and introduce it into the bale-forming chamber, but which also serves as an integral part of the elevated forming chamber and rolling mechanism.

In the drawings:

FIG. 4 is an enlarged, fragmentary detail view illustrating the construction and method of attachment of lifting tines on the rear bank of flexible belts;

FIG. 7 is a schematic view of the machine on a reduced scale with one side of the housing removed and illustrating the manner in which bale-formation is initiated; and FIG. 8 is a view similar to FIG. 7 showing the formation process shortly after initiation when the bale is fully supported off the ground.

Figure 1:
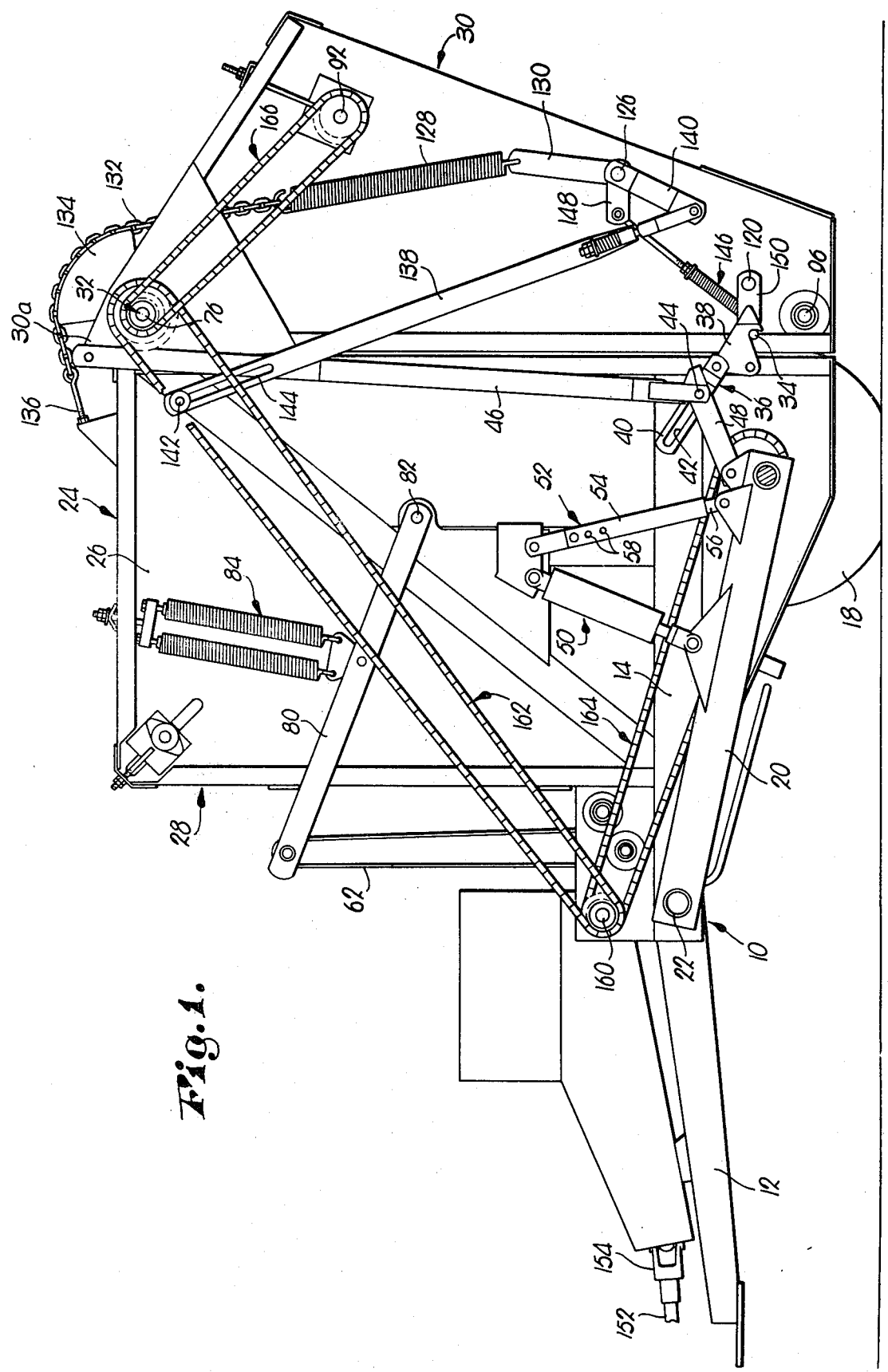
FIG. 1 is a side elevational view of a machine constructed in accordance with the principles of the present invention.

The machine of the present invention has a main frame 10 that includes a forwardly extending tongue 12 adapted at its forwardmost end for coupling with a towing vehicle (not shown). Frame 10 also includes a pair of laterally spaced-apart, fore-and-aft extending members 14 on opposite sides of the machine that are rigidly connected to the tongue 12 through a cross pipe 16 at the rear of tongue 12 spanning the front of the machine. Ground-engaging wheels 18 disposed on opposite sides of the machine support frame 10 and are carried on arms 20 that are rigidly interconnected at their forwardmost ends by a torque tube 22 that extends through pipe 16 and is rotatable within the latter. Frame 10 can thereby be raised and lowered relative to wheels 18 when tube 22 is rotated within cross pipe 16.

Figure 6:
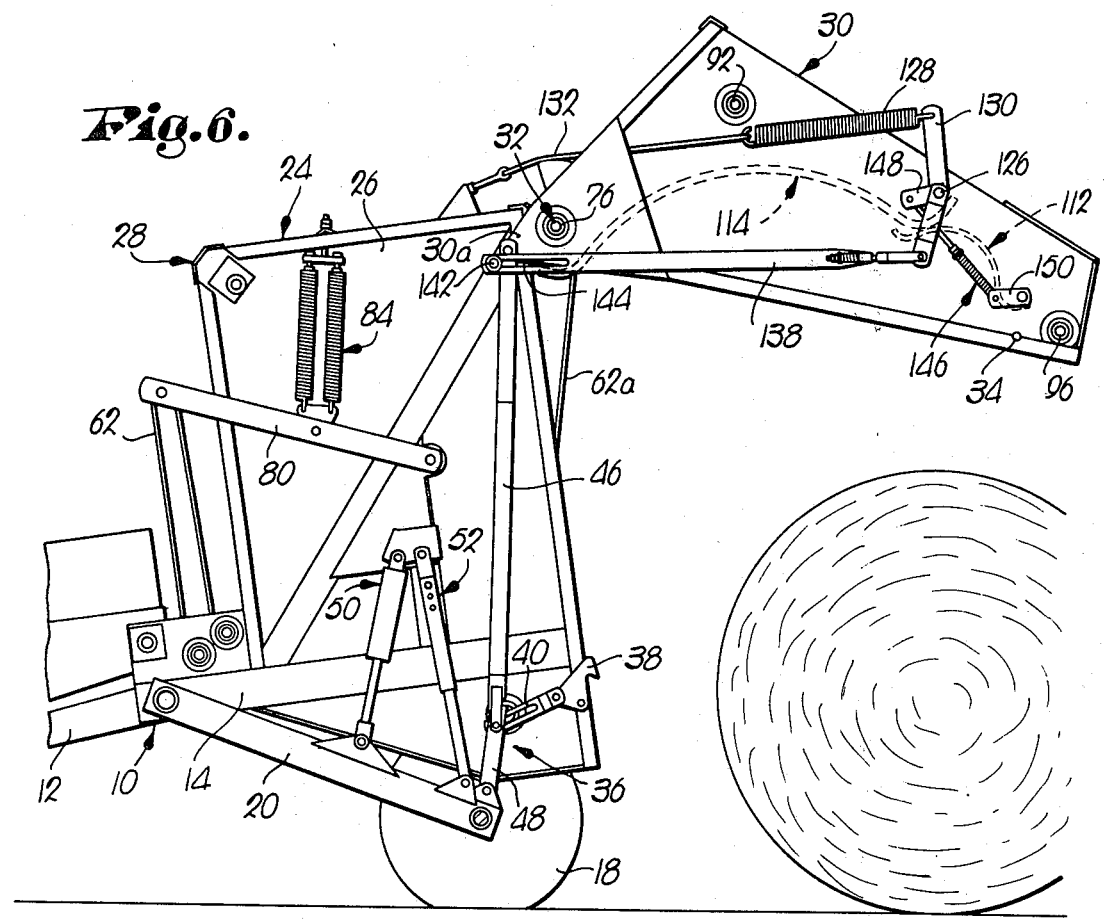
FIG. 6 is an opposite side elevational view on a reduced scale illustrating discharge of a finished bale.

A housing, broadly denoted by the numeral 24, is carried between frame members 14 behind cross pipe 16 and has an open top, bottom, front and rear but has closed sides 26. A front section 28 of housing 24 is directly secured to frame members 14, and a rear section 30 is swingably mounted on front section 28 for vertical swinging movement about an upper horizontal pivot 32 between a closed position such as shown in FIG. 1 and an opened position such as shown in FIG. 6. Each side 26 of the rear section 30 is provided with an outwardly projecting pin 34 at its lower front corner which is engageable by a latch assembly 36 to releasably hold section 30 in its closed position. Each assembly 36 includes a generally triangular catch 38 swingably mounted on front section 28 and a slotted actuating link 40 swingably coupled with catch 38 for moving the latter between alternate positions retaining and releasing pin 34.

The slot 42 in each link 40 shiftably receives a pin 44 that intercouples a long, generally upright strap 46 and a shorter strap 48, the upright strap 46 being swingably coupled at its uppermost end with a forward extension 30a of the rear section 30 and the strap 48 being swingably coupled at its lower end with the rear end of the corresponding arm 20. When a pair of hydraulic cylinder units 50, which interconnect the front section 28 and arms 20, are extended from the retracted condition illustrated in FIG. 1, the first reaction is to cause the frame 10 and hence housing 24 to be raised further off the ground such as to the position shown in FIG. 5. During this initial movement lost motion takes place as the pins 44 are shifted toward the opposite ends of their slots 42 during unbuckling of the straps 46, 48. Hence, initially, there is no disengagement of the catches 38 from pins 34. However, upon further actuation of the hydraulic units 50 to move the pins 44 completely to the opposite ends of their slots 42 beyond that shown in FIG. 5, the result is pulling on the catches 38 by links 40 to release the pins 34. Subsequent further actuation of units 50 causes the straps 46, 48 to be in virtually longitudinal alignment to thereby crank rear section 30 open as frame 10 remains elevated relative to the wheels 18.

Each arm 20 also carries a limit device 52 that interconnects the corresponding arm 20 with the side 26 of housing 24. More particularly, each device 52 comprises an outer tube 54 connected at its upper end to side 26 and an inner tube 56 telescopically received within outer tube 54 and connected at its lower end to the arm 20. Inner tube 56 extends and retracts during raising and lowering respectively of housing 24, and the lowest height at which housing 24 shall be supported above the ground can be determined by selectively inserting a pin (not shown) into any one of the three holes 58 in outer tube 54. When inserted, the pin spans the outer tube 54 and serves as an innermost stop for the inner tube 56.

Figure 3:
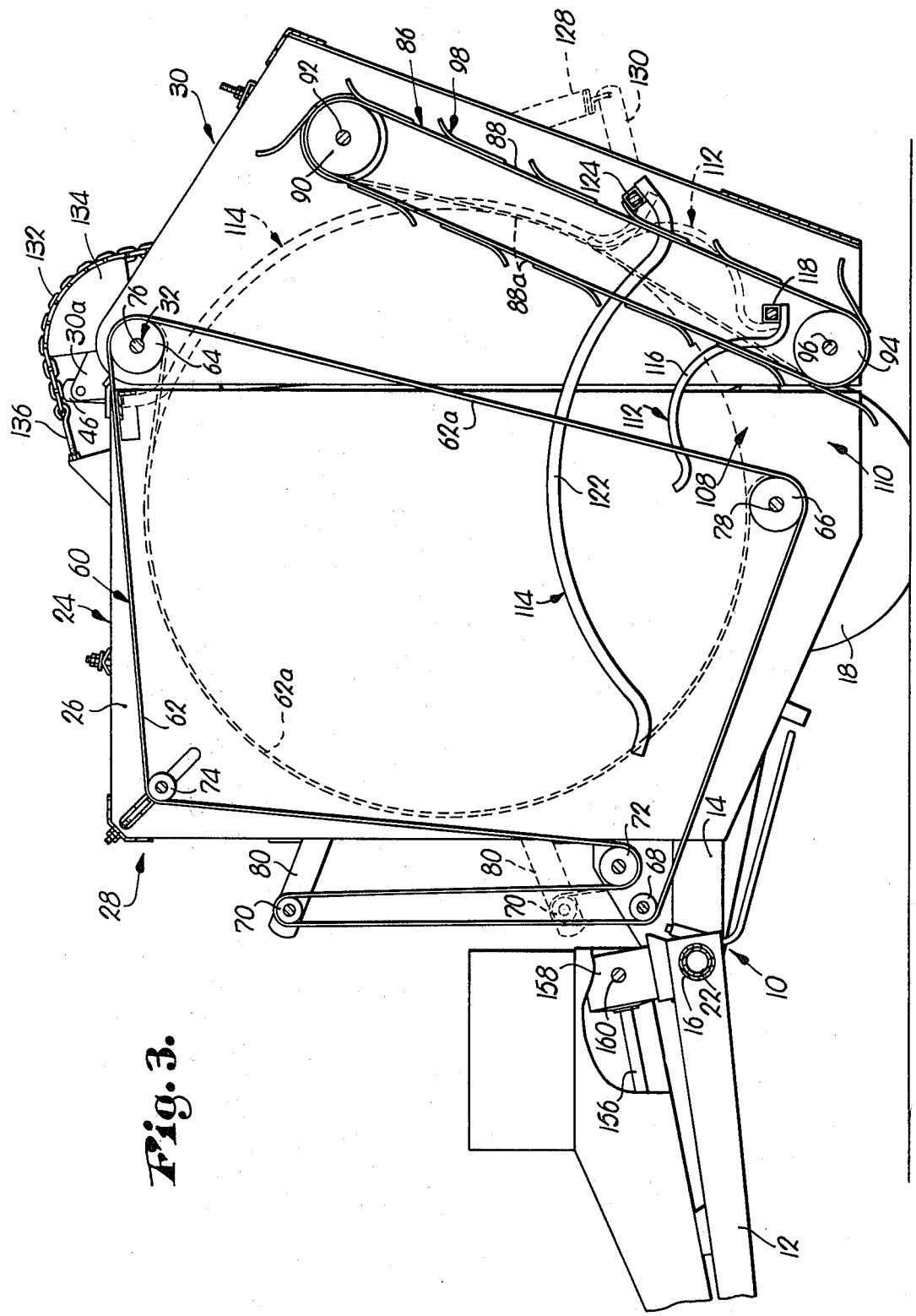
FIG. 3 is a vertical cross-sectional view of the machine taken along line 3—3 of FIG. 1 and showing positions of the various components prior to bale formation in solid lines and positions of the same components upon completed bale growth in dashed lines.

As perhaps shown most clearly in FIGS. 3, 7 and 8, the front section 28 contains a set 60 of flexible belt elements 62 that are looped around a series of transverse rollers 64, 66, 68, 70, 72 and 74, the belts 62 being laterally spaced along the rollers 64–74 to occupy the space between sides 26. Upper roller 64 is carried on rear section 30 by a transverse shaft 76 coinciding with the pivot 32 for rear section 30 while, on the other hand, lower roller 66 is carried by the front section 28. Rollers 68 and 72 are carried by the frame members 14, while roller 70 is carried between a pair of fore-and-aft extending arms 80 swingably mounted on pivots 82 (FIG. 1) for movement between the solid line and dashed line position indicated in FIG. 3.

Each arm 80 is provided with a spring assembly 84 (FIGS. 1, 5 and 6) which yieldably biases the arm 80 upwardly in order to maintain yieldable tension on the belt set 60. Roller 74 is carried by the front section 28 and can be adjustably shifted diagonally to selectively set the tension on the belts 62 when the arms 80 are in their fully raised positions and to control "creeping" of belts 62 along all rollers 64–74.

Figure 2:
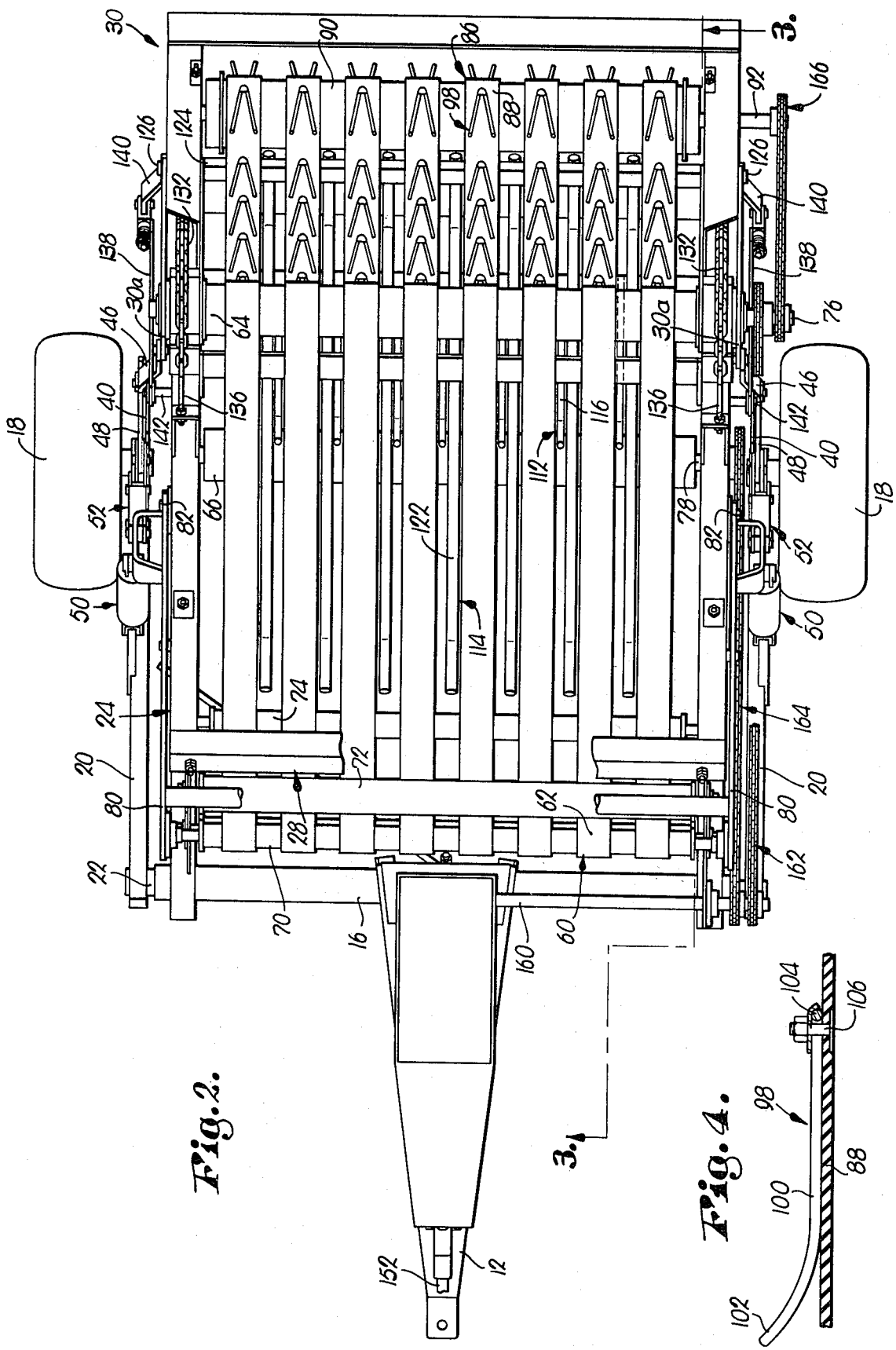
FIG. 2 is a top plan view of the machine.

The rear section 30 contains a bank 86 of endless flexible belt elements 88 that are inclined slightly rearwardly from the vertical as illustrated best in FIGS. 3, 7 and 8. Belts 88 at their upper ends are looped around a drum 90 that spans sides 26 and is carried on a drive shaft 92, while at their lower ends, the belts 88 are looped around a similar drum 94 carried on shaft 96 and disposed slightly forwardly of the upper drum 90. Lower drum 94 is so positioned on rear section 30 as to be spaced but a short distance downwardly and rearwardly from the roller 66 within front section 28 when rear section 30 is latched closed by latch assemblies 36, such spacing being on the order of 9 to 13 inches. As shown in FIG. 2 the belts 88 are spaced apart along the drums 90 and 94 so as to fully occupy the space between opposed sides 26 of the rear section 30.

Each belt 88 carries a series of lifting tines 98, each of which is generally V-shaped as shown in FIG. 2, the longitudinal axis of each tine 98 coinciding with the longitudinal axis of its belt 88. As illustrated in detail in FIG. 4, the legs 100 of each tine 98 have outturned tips 102 at one end thereof and are integrally joined at their opposite end through a bight 104 that is clamped to belt 88 by a fastener 106. As illustrated, the legs 100 normally lie flatly against belt 88 leaving only the tips 102 projecting outwardly beyond the surface of belt 88.

The front set 60 of belts 62 cooperates with the rear bank 86 of belts 88 to partially define an off-the-ground expandable bale-forming chamber denoted by the numeral 108, the front of chamber 108 being presented by the substantially vertical rearmost stretches 62a of belts 62 and the rear of chamber 108 being presented by the generally vertical forwardmost stretches 88a of belts 88. A bottom entrance to the forming chamber 108 is defined by the space between roller 66 and drum 94 and is designated by the numeral 110, such entrance 110 extending clear across housing 24 between its opposed sides 26.

Figure 5:
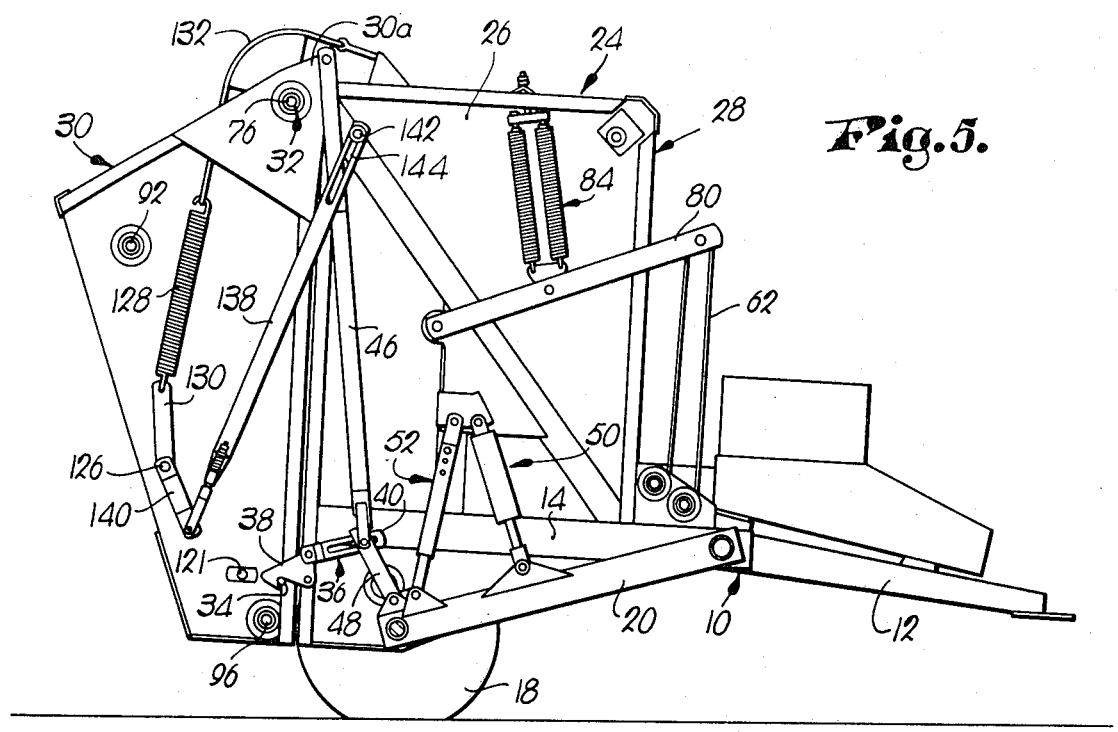
FIG. 5 is an elevational view of the machine on a reduced scale showing the side opposite that illustrated in FIG. 1, the housing of the machine being elevated to its roading position.

Chamber 108 is further defined by a pair of upwardly arched retaining grids 112 and 114 extending between the stretches 62 and 88 above the entrance 110 to chamber 108. The lower grid 112 is substantially smaller than the upper grid 114 and has a plurality of laterally spaced-apart curved rods 116 that project at their forwardmost ends between belts 62 and at their rearwardmost ends between the belts 88. Rods 116 are secured at such rearmost ends to a common square tube 118 spanning the sides 26 of rear section 30 and rotatably mounted thereon by stub shafts 120 and 121 (FIGS. 1, 5, and 6). Shaft 121 is fixedly mounted on the side 26 of section 30 while longer shaft 120 is fixed to square tube 118 and is rotatable relative to the opposite side 26 of section 30. Similarly, the upper grid 114 has curved rods 122 that extend at their forwardmost ends between belts 62 and at their rearwardmost ends between belts 88, the rods 122 being secured at such rearmost ends to a common square tube 124 that extends across and is rotatably mounted on the sides 26 of rear section 30 by stub shafts 126 (FIGS. 1 and 2).

Top grid 114 is spring-biased into its generally horizontal position shown in FIGS. 3, 7 and 8 by a pair of coil springs 128 on opposite sides 26 of section 30, each spring 128 being connected between a crank 130 on stub shaft 126, and a chain 132 looped over a sector-shaped guide 134 and secured to the front section 28 by an anchor bolt 136. Downward swinging of grid 114 is limited by a pair of long, generally upright links 138 on opposite sides 26 of housing 24 that are each pivotally secured at their lower end to a second crank 140 on stub shaft 126 and which has a slotted connection at their upper end with an outwardly projecting pin 142 on front section 28. Slot 144 in each link 138 thus allows the grid 114 to swing upwardly to its dashed-line position indicated in FIG. 3 during bale growth as the links 138 are pushed upwardly by crank 140, while pins 142 prevent downward swinging of grid 114 past the solid-line position of FIG. 3 when pins 142 have engaged the uppermost ends of slots 144 as shown in FIG. 1.

The small grid 112 is also spring-biased downwardly into its normal horizontal position illustrated in FIGS. 3 and 7, and such biasing is accomplished by a single spring-loaded unit 146 on one side 26 of rear section 30 that interconnects a third crank 148 on stub shaft 126 with a fourth crank 150 on stub shaft 120. Unit 146 is operable to yieldably resist clockwise swinging of small grid 112 from the solid line position in FIG. 3 to the dashed-line position thereof in the same Figure, but on the other hand, each unit 146 is also operable to pull small grid 112 clockwise viewing FIG. 3 when cranks 148 of the large grid 114 are swung clockwise viewing FIG. 1. Thus, while small grid 112 may swing upwardly independently of large grid 114, when the latter is swung upwardly the small grid 112 must follow.

The belts 62 of front set 60 are normally driven in a clockwise path of travel viewing FIGS. 3, 7 and 8 such that the rearmost stretches 62a move downwardly as indicated in FIGS. 7 and 8. Similarly, the belts 88 of bank 86 are also driven clockwise viewing FIGS. 3, 7 and 8 so that the forwardmost stretches 88a are moving upwardly as illustrated in FIGS. 7 and 8.

Power to drive the belts 62 and 88 may be obtained from a power takeoff shaft 152 above tongue 12 which is in turn coupled through a universal joint 154 with a drive shaft 156 (FiG. 3) that leads rearwardly to right-angle gearbox 158. A jackshaft 160 leads from gearbox 158 across the front of housing 24 to the left corner thereof where it supplies driving power to a pair of chain and sprocket assemblies 162 and 164, the assembly 162 leading upwardly and rearwardly to drive the shaft 76 of roller 64, and the assembly 164 leading downwardly and rearwardly to drive the shaft 78 of roller 66. A third chain and sprocket assembly 166 on rear section 30 takes driving power from shaft 76 and supplies it to the shaft 92 associated with upper drum 90.

OPERATION

As the machine advances across a field having a layer of windrowed material 168 thereon as illustrated in FIGS. 7 and 8, the components of the machine are initially in their various positions illustrated in FIGS. 3 and 7. The wheels 18 straddle the windrow 168 and the housing 24 passes over windrow 168 until entrance 110 to chamber 108 is reached, whereupon the tines 98 on belts 88 sweep the material in an upward and forward direction as tines 98 flip out rounding the lower drum 94. Such action imparts a forward tumbling action to the crop material at the same time that it is lifted by tines 98 toward entrance 110 and chamber 108. This forward tumbling motion is augmented by the downwardly moving belt stretches 62a in opposition to the upwardly moving belt stretches 88a, and also by the lower grid 112 such that the loose material beings to roll up on itself in the vicinity of entrance 110 as illustrated in FIG. 7.

Depending upon the entire of the crop material being baled, the initial forward tumbling action may be limited to the area within and below entrance 110, or the material may completely fill chamber 108 at this time from the very start of the tumbling action. In any event, the loose material is initially confined between the ground and the mechanism which imparts the tumbling or rolling action to the loose material, such mechanism consisting of the oppositely moving belt stretches 62a and 88a along or in combination with the small grid 112.

Subsequently, the narrow entrance 110 simply becomes too small to confine the rolling action within and below the latter such that the loose material, which has by now taken on the characteristics of a rather firm, cylindrical bale core, becomes confined solely to the chamber 108 above drum 94 and roller 66 as illustrated in FIG. 8. Hence, as additional material continues to be swept upwardly through entrance 110 into chamber 108 by tines 98, the bale core 170 of FIG. 8 begins to increase in diameter to the extent permitted by the rearwardly swinging small grid 112 and the forwardly displacing stretches 62a. Such latter displacement of stretches 62a is of course yieldably resisted by the spring-loaded arms 80 which maintain tension on stretches 62a and yet swing downwardly toward the dashed-line positions of FIG. 3 to permit the arcuate displacement of stretches 62a necessary to accommodate bale growth.

As the bale continues to grow in diameter, expanding chamber 108, it is supported on and confined against escape by the lower roller 66 and lower drum 94, although it will be recognize that the bale tends to grow away from drum 94 as the bale's center of gravity becomes progressively displaced forwardly into front section 28. Also during such growth, the small grid 112 swings back substantially, whereupon the larger grid 114 begins to apply its retaining and compacting force, it too yielding rearwardly as the bale progressively increases in size until, finally, grids 112, 114 and belt stretches 62a are all in the dashed-line positions illustrated in FIG. 3 to accommodate the full-sized bale.

Advancement of the machine may then be temporarily halted while belts 62 and 88 continue to roll the bale within chamber 108, and the bale may be tied by introducing twine from a source not shown underneath the rolling bale to cause it to be wrapped about the latter. Thereupon, the twine is severed and the bale is ready to be discharged, either at the immediate location or at a point remote therefrom, in which latter event the bale can be quite easily transported within chamber 108 after operation of belts 62 and 88 has been terminated.

If the bale is to be transported for any appreciable distance, housing 24 might preferably be elevated to the position of FIG. 5 by actuating hydraulic cylinders 50 to raise frame 10 relative to arms 20. Otherwise, it is only necessary to actuate cylinders 50 to their fullest extent as illustrated in FIG. 6, causing the latch assemblies 36 to release the rear section 30 and forcing the rear section 30 to be opened by the straps 46. The front belts 62 are of course under considerable tension at this point, and, therefore, they help forcefully to eject the bale onto the ground as they seek to return to their normal, more relaxed conditions. Note that when rear section 30 is fully raised as illustrated in FIG. 6, the links 138 through crank 140 maintain the grids 112 and 114 raised to their fullest extent such that they cannot interfere with bale discharge. At this time the tension on springs 128 is released, as a result of the relationship between pivot 32 and the guides 134, so that springs 128 are not working against the efforts of links 138 to hold grids 112, 114 raised. It is then only necessary to retract cylinders 50 so as to re-latch section 30 in its closed position, following which housing 24 may be lowered to its desired height and the baling process continued.

Having thus described the invention, what is claimed as new and desired to be secured by Letters Patent is:

1. In a mobile baler of the type having a housing provided with an off-the-ground baling chamber and means associated therewith for making a round bale within the chamber from crop materials presented thereto, the improvement comprising:
   a crop entrance to the chamber located adjacent a lower portion thereof;
   a crop pickup having a crop engaging portion thereof located generally below said chamber and behind the front of the housing with respect to the normal direction of travel of the baler for lifting crop materials from the ground and feeding the same up toward said chamber; and
   an open, non-compressive crop receiving and inflow region extending from said crop-engaging portion of the pickup to the forward extremity of said entrance whereby to substantially prevent compaction of picked up crop materials prior to the same reaching said baling chamber.

2. A method of baling crop materials into a round bale that includes the steps of:

picking up crop materials from the field at a point generally underneath a baling chamber while traveling across the field;

feeding the picked up materials up into the baling chamber without first compacting the same between a pair of opposed rollers or the like; and rolling the materials into a bale within said chamber.

* * * * *

UNITED STATES PATENT AND TRADEMARK OFFICE
CERTIFICATE OF CORRECTION

PATENT NO. : 4,386,493

DATED : June 7, 1983

INVENTOR(S) : Holdeman et al

It is certified that error appears in the above-identified patent and that said Letters Patent is hereby corrected as shown below:

On the cover sheet the item designated [*] should read as follows:

-- Notice: The portion of the term of this patent subsequent to March 30, 1999, has been disclaimed --.

Signed and Sealed this

Second Day of April 1985

[SEAL]

Attest:

DONALD J. QUIGG

Attesting Officer     Acting Commissioner of Patents and Trademarks